US011072393B2

(12) United States Patent
Kamijo (10) Patent No.: US 11,072,393 B2
(45) Date of Patent: Jul. 27, 2021

(54) TRANSMISSION FOR SADDLED VEHICLE (71) Applicant: HONDA MOTOR CO., LTD., Tokyo (JP)

(72) Inventor: Satoru Kamijo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 153 days.

(21) Appl. No.: 16/474,250

(22) PCT Filed: Jan. 12, 2017

(86) PCT No.: PCT/JP2017/000884
§ 371 (c)(1),
(2) Date: Jun. 27, 2019

(87) PCT Pub. No.: WO2018/131128
PCT Pub. Date: Jul. 19, 2018

(65) Prior Publication Data
US 2020/0122806 A1 Apr. 23, 2020

(51) Int. Cl.
B62M 25/06 (2006.01)
B62K 23/08 (2006.01)
(Continued)

(52) U.S. Cl.
CPC ............. B62M 25/06 (2013.01); B62K 23/08 (2013.01); G05G 1/46 (2013.01); B62H 1/02 (2013.01)

(58) Field of Classification Search
CPC ......... B62M 25/06; B62K 23/08; G05G 1/46; B62H 1/02
See application file for complete search history.

(56) References Cited

U.S. PATENT DOCUMENTS 8,051,739 B2 * 11/2011 Nishiura .................. B62J 25/00
74/473.16
9,022,163 B2 * 5/2015 Nakamura ............. B62K 23/08
180/336
(Continued)

FOREIGN PATENT DOCUMENTS

EP 1 772 366 A1 4/2007
EP 1 897 793 A1 3/2008
(Continued)

OTHER PUBLICATIONS

European Office Action dated Aug. 28, 2020, 5 pages.
(Continued)

Primary Examiner — Adam D Rogers
(74) Attorney, Agent, or Firm — Rankin, Hill & Clark LLP (57) ABSTRACT A transmission for a saddled vehicle with which a posture of a rider is easily held during driving of the vehicle and a speed change detection device can be protected. A step for the driver extends outward in a vehicle width direction from a lower frame; a gear change pedal is turn-operated by a rider's foot for speed change; and a link for detection is coupled with the gear change pedal. A speed change detection device is coupled with a tip of the link for detection, and detects a speed change operation by the gear change pedal. The gear change pedal is arranged on an outer side of a lower frame in the vehicle width direction, and the speed change detection device is arranged on an inner side of pivot frames and the lower frame in the vehicle width direction.

20 Claims, 10 Drawing Sheets (51) Int. Cl.
    *G05G 1/46* (2008.04)
    *B62H 1/02* (2006.01)

(56) References Cited

U.S. PATENT DOCUMENTS

| | | | |
|---|---|---|---|
| D776,025 S * | 1/2017 | Tsai | D12/179 |
| 9,994,286 B2 * | 6/2018 | Imai | B62K 11/04 |
| 10,718,424 B2 * | 7/2020 | Takahashi | F16H 63/14 |
| 2008/0060865 A1 | 3/2008 | Prielinger et al. | |
| 2010/0212448 A1 | 8/2010 | Sato | |

FOREIGN PATENT DOCUMENTS

| | | |
|---|---|---|
| JP | 2006-347401 | 12/2006 |
| JP | 2010-195319 | 9/2010 |
| JP | 2010-196855 | 9/2010 |
| WO | 2006/011441 | 2/2006 |
| WO | 2015/029520 A1 | 3/2015 |

OTHER PUBLICATIONS

Indian Office Action dated Jun. 25, 2020, 6 pages.
International Preliminary Report on Patentability dated Jul. 25, 2019, 9 pages.
European Search Report dated Dec. 19, 2019, 8 pages.
International Search Report, dated Mar. 21, 2017 (Mar. 21, 2017), 2 pages.
Wrtten Opinion, 5 pages.
European Office Action dated Apr. 20, 2021, 5 pages.

\* cited by examiner

TRANSMISSION FOR SADDLED VEHICLE

TECHNICAL FIELD

The present invention relates to a transmission for a saddled vehicle.

BACKGROUND ART

Conventionally, as a transmission for a saddled vehicle, a structure has been known in which a detection device to detect a speed change operation by a driver is attached to a vehicle body frame via a base plate, an operation pedal for a speed change operation and the detection device are arranged on an inner side of the base plate in a vehicle width direction, and a turning shaft of the operation pedal and a longitudinal direction of the detection device are arranged in the vehicle width direction (for example, see Patent Literature 1).

CITATION LIST

Patent Literature

[Patent Literature 1]
International Publication No. WO2006/011441

SUMMARY OF INVENTION

Technical Problem

In Patent Literature 1, since a base plate is attached to a vehicle body frame, and an operation pedal and a detection device are attached to the base plate, it is necessary to swell the vehicle body frame more outward in a vehicle width direction, and a structure is such that is difficult to knee-grip. Therefore, it becomes difficult to hold a posture of a rider. Further, if the detection device is arranged on an outer side of the vehicle body frame, the detection device is externally exposed, and it becomes difficult to protect the detection device.

An object of the present invention is to provide a transmission for a saddled vehicle with which a posture of a rider is easily held during driving of the vehicle and a speed change detection device can be protected.

Solution to Problem

An aspect of the present invention is a transmission for saddled vehicle including: a vehicle body frame (11), a main step (53) which extends outward in a vehicle width direction from the vehicle body frame (11) and on which a rider putting a rider's foot, an operation pedal (68) to be turn-operated by the rider's foot for speed change, a link member (98) coupled with the operation pedal (68), and a speed change detection device (80) coupled with a tip of the link member (98) and detecting a speed change operation by the operation pedal (68), wherein the operation pedal (68) is arranged on an outer side of the vehicle body frame (11) in the vehicle width direction, and the speed change detection device (80) is arranged on an inner side of the vehicle body frame (11) in the vehicle width direction.

In the above aspect of the invention, a longitudinal direction of the speed change detection device (80) may be an up-down direction, and a sensor body (82) provided on the speed change detection device (80) may be provided on an upper end of the speed change detection device (80).

Further, in the above aspect of the invention, the link member (98) may be arranged below the vehicle body frame (11) in such a manner of being across the vehicle body frame (11) in the vehicle width direction.

Further, in the above aspect of the invention, the speed change detection device (80) may be supported by a stay (76) fixed to the vehicle body frame (11), and the link member (98) may couple the operation pedal (68) and the speed change detection device (80) in such a manner that an axis (71a) of a rocking shaft (71) of the operation pedal (68) and an axis (84a) of a turning shaft (84) provided for the speed change detection device (80) point in different directions.

Further, in the above aspect of the invention, the speed change detection device (80) may be arranged above an exhaust pipe (35) discharging exhaust gas of the vehicle.

Further, in the above aspect of the invention, the link member (98) may be curved and coupled with the operation pedal (68) and the speed change detection device (80) via ball joints (101, 102).

Further, in the above aspect of the invention, the sensor body (82) may be arranged on an upper end part side of the turning shaft (84), and the link member (98) may be coupled with a lower end part side of the turning shaft (84).

Advantageous Effects of Invention

In an aspect of the present invention, since an operation pedal is arranged on an outer side of a vehicle body frame in a vehicle width direction, and a speed change detection device is arranged on an inner side of the vehicle body frame in the vehicle width direction, the vehicle body frame is arranged between the operation pedal and the speed change detection device, and the vehicle body frame can be arranged close to a center in the vehicle width direction, which enables a structure easy to knee-grip. Thereby, it becomes easy to hold a posture of a rider. Further, it is possible to arrange the speed change detection device on the inner side of the vehicle body frame in the vehicle width direction, and it is possible to protect the speed change detection device by the vehicle body frame.

In the above aspect of the invention, since a longitudinal direction of the speed change detection device is an up-down direction, and a sensor body provided on the speed change detection device is provided on an upper end of the speed change detection device, it is possible to arrange the sensor body away from the ground. Therefore, the sensor body can be protected from dust, muddy water, pebbles and the like kicked up by the vehicle.

Further, in the above aspect of the invention, since a link member is arranged below the vehicle body frame in such a manner of being across the vehicle body frame, it is not necessary to provide the vehicle body frame with a hole for causing the link member to pass through. Therefore, it is possible to make rigidity of the vehicle body frame appropriate, and it is possible to improve running performance of the vehicle.

Further, in the above aspect of the invention, since the speed change detection device is supported by a stay fixed to the vehicle body frame, and the link member couples the operation pedal and the speed change detection device in such a manner that an axis of a rocking shaft of the operation pedal and an axis of a turning shaft provided for the speed change detection device point in different directions, it becomes possible to cause the longitudinal direction of the speed change detection device to point to the up-down direction, and the whole speed change detection device can be arranged close to the vehicle body frame. Therefore, the stay can be downsized. Thereby, the vehicle body frame can be arranged closer to the center in the vehicle width direction, and, even if the speed change detection device is provided, a structure is such that is easy to knee-grip. Therefore, it is possible to make it easy to hold a posture.

Further, in the above aspect of the invention, since the speed change detection device is arranged above an exhaust pipe to discharge exhaust gas of the vehicle, it is possible to protect the speed change detection device from dust, muddy water, kicked-up pebbles and the like by the exhaust pipe.

Further, in the above aspect of the invention, since the link member is curved and is coupled with the operation pedal and the speed change detection device via ball joints, it is possible to, even if the axial directions of the turning shaft of the operation pedal and the turning shaft of the speed change detection device are different, transmit a speed change operation of the operation pedal to the speed change detection device without a trouble.

Further, in the above aspect of the invention, since the sensor body is arranged on an upper end part side of the turning shaft, and the ling member is coupled with a lower end part side of the turning shaft, it becomes possible to cause the turning shaft to point in the up-down direction, and the whole speed change detection device can be arranged close to the vehicle body frame. Therefore, the stay can be downsized. Thereby, the vehicle body frame can be arranged closer to the center in the vehicle width direction, and a structure that is easy to knee-grip is obtained even if the speed change detection device is provided. Therefore, it is possible to make it easy to hold a posture.

DESCRIPTION OF EMBODIMENT

One embodiment of the present invention will be explained below with reference to drawings. Note that, in the explanation, as for description of directions such as front-back, left-right and up-down directions, the directions are assumed to be the same as directions for a vehicle unless otherwise stated. Further, reference symbol FR shown in each drawing indicates a forward direction of the vehicle; reference symbol UP indicates an upward direction of the vehicle; and reference symbol LH indicates a left direction of the vehicle.

Figure 1:
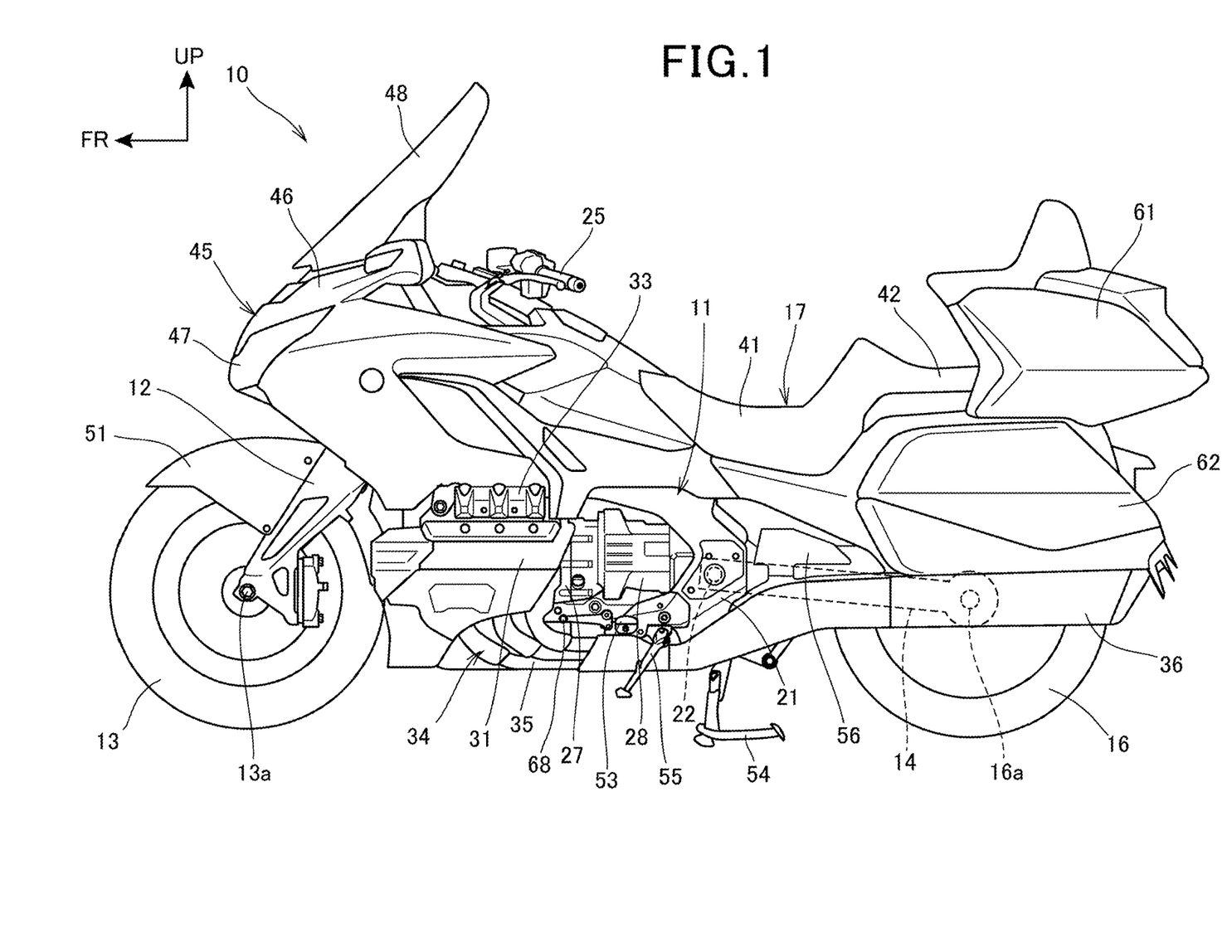
FIG. 1 is a left side view of a motorcycle provided with a transmission according to the present invention.

FIG. 1 is a left side view of a motorcycle 10 provided with a transmission 105 according to the present invention.

The motorcycle 10 is a saddled vehicle provided with a front wheel 13 supported by a front end part of a vehicle body frame 11 via a front fork 12, a rear wheel 16 supported by a lower part of the vehicle body frame 11 via a swing arm 14, and a seat 17 provided on an upper part of a vehicle body.

The vehicle body frame 11 is provided with a pair of left and right pivot frames 21 located below the seat 17. A pivot shaft 22 is supported by the left and right pivot frames 21 in such a manner of extending in a vehicle width direction.

A steering wheel 25 is attached to an upper end part of the front fork 12, and the front wheel 13 is supported by a lower end part via an axle 13a.

A front end part of the swing arm 14 is rockably supported by the pivot shaft 22, and the rear wheel 16 is rotatably supported by a rear end part.

An engine 27 supported by the vehicle body frame 11 is arranged behind the front wheel 13, and a transmission 28 is integrally provided on a rear part of the engine 27.

The engine 27 is a horizontally opposed engine, and cylinder portions 31 protrude in left and right lateral directions, respectively, from a crank case (not shown) provided at a central part in the vehicle width direction. An intake device 33 is connected to upper parts of the cylinder portions 31, and an exhaust device 34 is connected to lower parts of the cylinder portions 31.

The exhaust device 34 is configured with an exhaust pipe 35 extending downward and rearward from the cylinder portions 31 and a muffler 36 connected to a rear end part of the exhaust pipe 35.

The transmission 28 is provided with an output shaft (not shown) on its rear part, and a drive shaft (not shaft) extends inside the swing arm 14 from the output shaft up to the rear wheel 16. Power is transmitted from the transmission 28 to the rear wheel 16 via the drive shaft.

Behind and obliquely below the steering wheel 25, a seat for driver 41 constituting the seat 17 and a seat for pillion passenger 42 are arranged. A front part and both side parts of the motorcycle 10 are covered with a vehicle body cover 45.

The vehicle body cover 45 is provided with a front cowl 46 on its front part. The front cowl 46 is provided with a headlight 47 and a wind screen 48.

The front wheel 13 is covered with a front fender 51 from upward. The lower part of the vehicle body frame 11 is provided with a step for driver 53, a main stand 54, a side stand 55 and a step for pillion passenger 56. A rear part of the vehicle body is provided with a trunk box 61 and a pair of left and right saddle bags 62.

Figure 2:
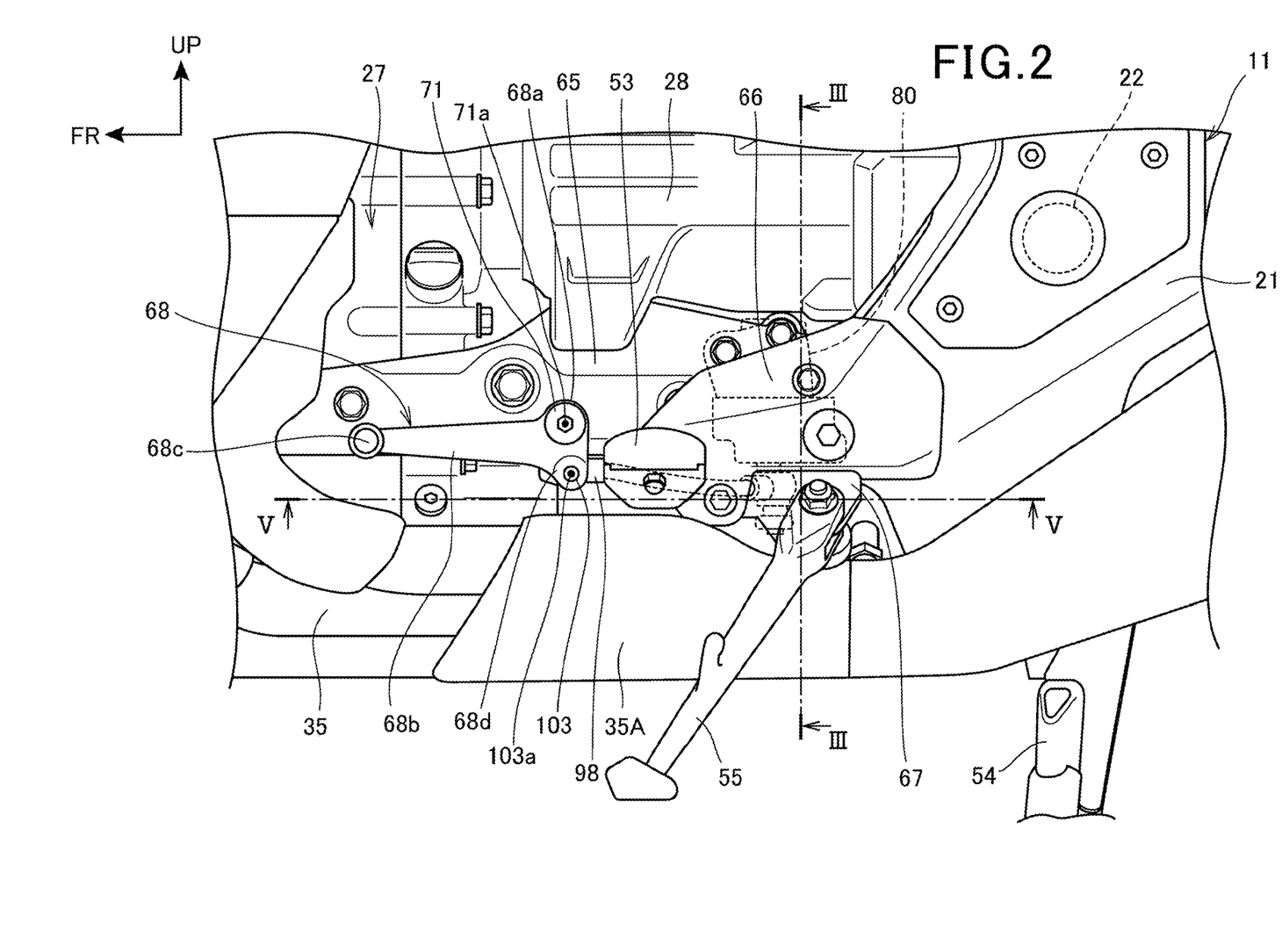
FIG. 2 is a left side view showing a main part of the motorcycle.

FIG. 2 is a left side view showing a main part of the motorcycle 10.

To a lower end part of a pivot frame 21, a lower frame 65 constituting the lower part of the vehicle body frame 11 is fastened. Further, to the lower end part of the pivot frame 21, a step bracket 66 and a stand bracket 67 are attached.

The step bracket 66 is attached to the pivot frame 21 in such a manner of covering the lower frame 65 from a lateral direction, and the step for driver 53 is supported by a front end part of the step bracket 66.

The stand bracket 67 is attached to the pivot frame 21 on an inner side of the step bracket 66 in the vehicle width direction, and the side stand 55 is rockably supported by the stand bracket 67.

To the lower frame 65, a gear change pedal 68 located in front of the step for driver 53 on a side view is attached.

The gear change pedal 68 is a pedal to perform a speed change operation and is provided with a supported portion 68*a*, a first arm portion 68*b*, a tread portion 68*c* and a second arm portion 68*d*.

The supported portion 68*a* is turnably supported by a support bolt 71 screwedly combined with the lower frame 65. The first arm portion 68*b* extends forward from the supported portion 68*a*. The tread portion 68*c* extends laterally in the vehicle width direction from a front end part of the first arm portion 68*b*, and the tread portion 68*c* is a part where the driver puts his foot. The second arm portion 68*d* extends downward from the supported portion 68*a*, and a link for detection 98 (see FIG. 3) to be described later is coupled with a tip part of the second arm portion 68*d*.

Below the lower frame 65, an aggregation portion 35A where a plurality of pipes constituting the exhaust pipe 35 are aggregated is arranged. The aggregation portion 35A constitutes a part of the exhaust pipe 35.

Figure 3:
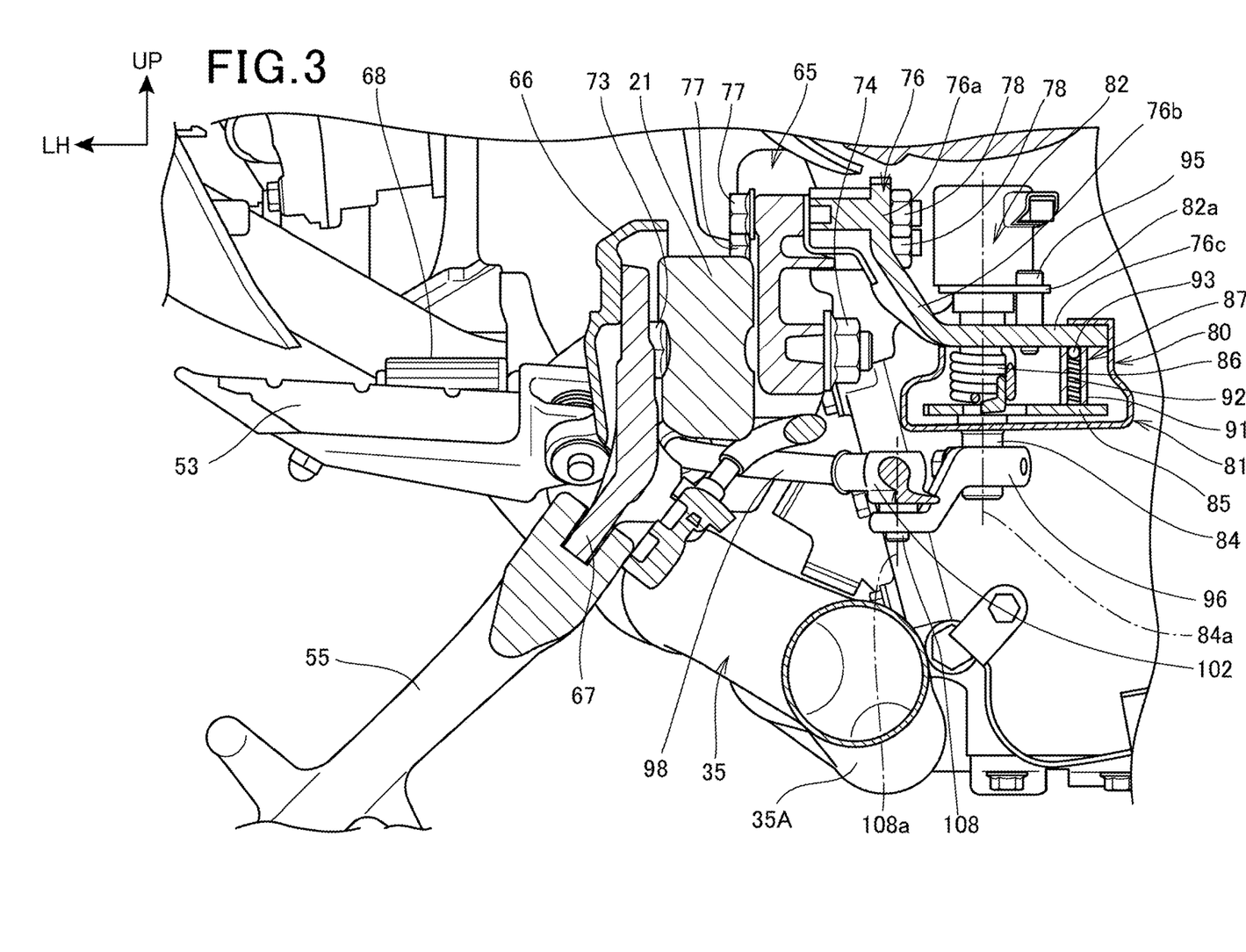
FIG. 3 is a cross-sectional view along a III-III line in FIG. 2.
Figure 4:
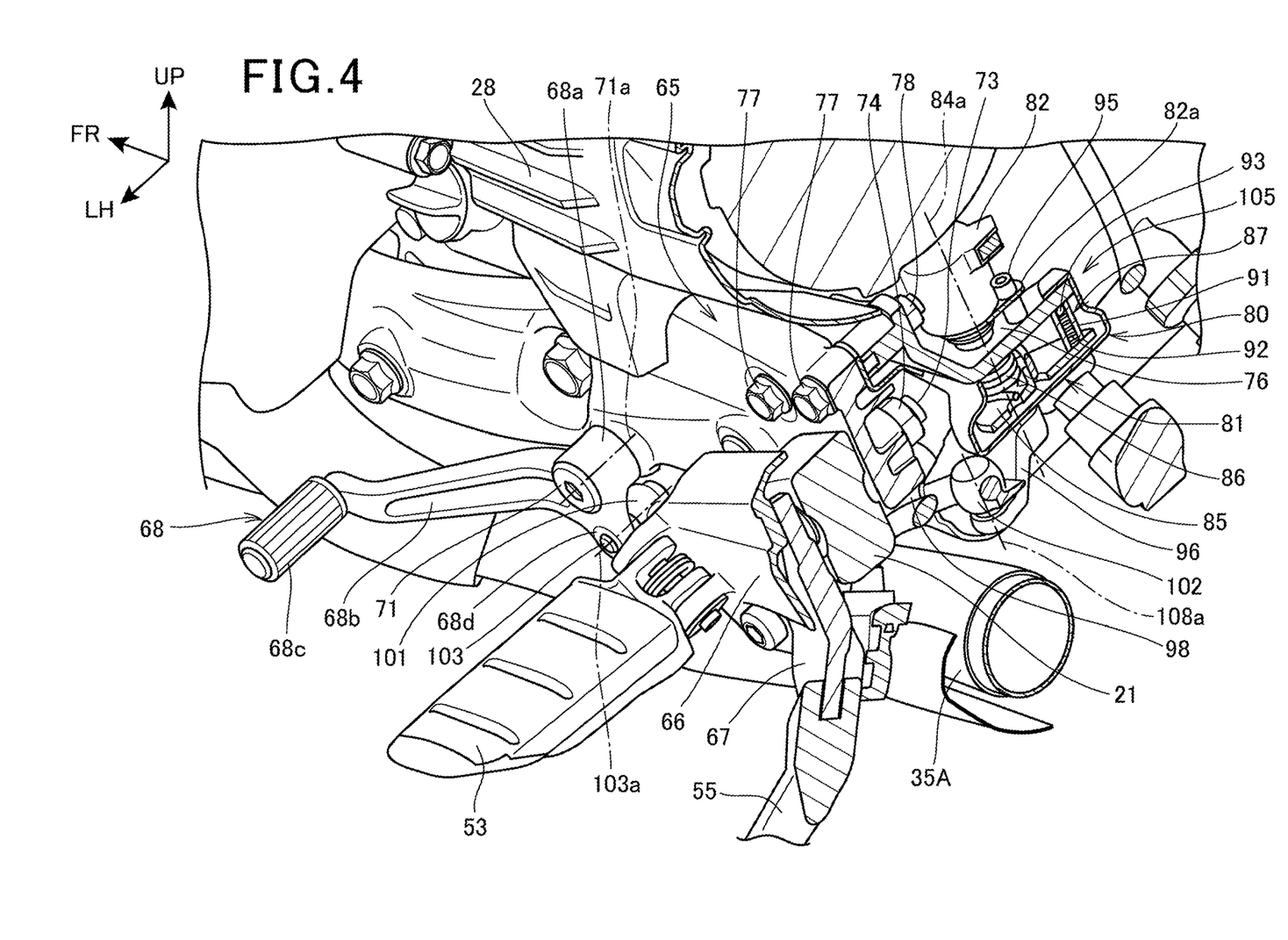
FIG. 4 is a perspective view including a cross section shown in FIG. 3.

FIG. 3 is a cross-sectional view along a III-III line in FIG. 2; and FIG. 4 is a perspective view including the cross section shown in FIG. 3.

As shown in FIGS. 3 and 4, the lower frame 65 is fastened with a plurality of bolts 73 and nuts 74 on an inner side part of the pivot frame 21.

Furthermore, on an inner side part of the lower frame 65, a stay 76 extending to an inner side in the vehicle width direction is fastened with bolts 77 and nuts 78, and a speed change detection device 80 is attached to the stay 76.

The speed change detection device 80 is a part to detect a speed change operation by the gear change pedal 68 (see FIG. 2) and is configured with a speed change input portion 81 to which a speed change operation transmitted from the gear change pedal 68 side is inputted and a sensor for speed change detection 82 to detect the speed change operation based on an output from the speed change input portion 81.

The stay 76 is configured with an upper part fastened portion 76*a* fastened to the lower frame 65, an inclined portion 76*b* extending obliquely downward from the upper part fastened portion 76*a* toward the inner side in the vehicle width direction and a flat portion 76*c* extending to the inner side in the vehicle width direction from a lower end of the inclined portion 76*b*.

The speed change detection device 80 is attached to the flat portion 76*c* of the stay 76.

Most of the speed change input portion 81 is arranged below the flat portion 76*c* of the stay 76, and the sensor for speed change detection 82 is arranged above the flat portion 76*c*.

The speed change input portion 81 is provided with a turning shaft 84 extending upward and downward, a turning plate 85 attached to the turning shaft 84 and a torsion coil spring 86 arranged in a manner of being wound around the turning shaft 84.

The turning plate 85 is provided with a turning position detecting portion 87 to generate a click feeling at the time of a speed change operation, on its top surface. The turning position detecting portion 87 is configured with a cylinder 91 attached to the turning plate 85, a compression coil spring 92 accommodated inside the cylinder 91, a ball 93 sandwiched between one end of the compression coil spring 92 and a flat portion 72*c* of the stay 76, and a plurality of recess portions formed on a surface of the flat portion 72*c*.

The torsion coil spring 86 has a function of returning the turning shaft 84 which has been turned, to a predetermined turning angle (a neutral position).

When the turning shaft 84 turns accompanying a speed change operation of the gear change pedal 68 (see FIG. 2), the turning shaft 84 turns from the predetermined angle (the neutral position) in one turning direction or in the other turning direction. At this time, at the neutral position and a maximum turning position (or a position close to the maximum turning position) in the one or other turning direction, the ball 93 is fitted in a recess portion formed on the flat portion 72*c* and becomes a resistance to turning. This is felt as a click feeling to notify the foot operating the gear change pedal 68 that a speed change operation has been performed.

The sensor for speed change detection 82 is integrally provided with a flange 82*a*, and the sensor for speed change detection 82 is fixed to the stay 76 by the flange 82*a* being attached to the flat portion 76*c* by a plurality of bolts 95.

The turning shaft 84 extends in the up-down direction and also serves as a turning shaft of the sensor for speed change detection 82. Turning of the turning shaft 84 in one direction or the other direction is detected by the sensor for speed change detection 82, and a speed change operation (shift up or shift down) is detected.

On a lower end part of the turning shaft 84 of the speed change detection device 80, an arm for detection 96 is attached. An end part of the link for detection 98 is rockably coupled with a tip part of the arm for detection 96 via a ball joint 102.

The link for detection 98 extends from the arm for detection 96 side to the gear change pedal 68, passing below the lower frame 65.

Below the lower frame 65 and the speed change detection device 80, the aggregation portion 35A of the exhaust pipe 35 is arranged. Thereby, the speed change detection device 80 is protected from pebbles kicked up from a road surface, and the like by the exhaust pipe 35.

Figure 5:
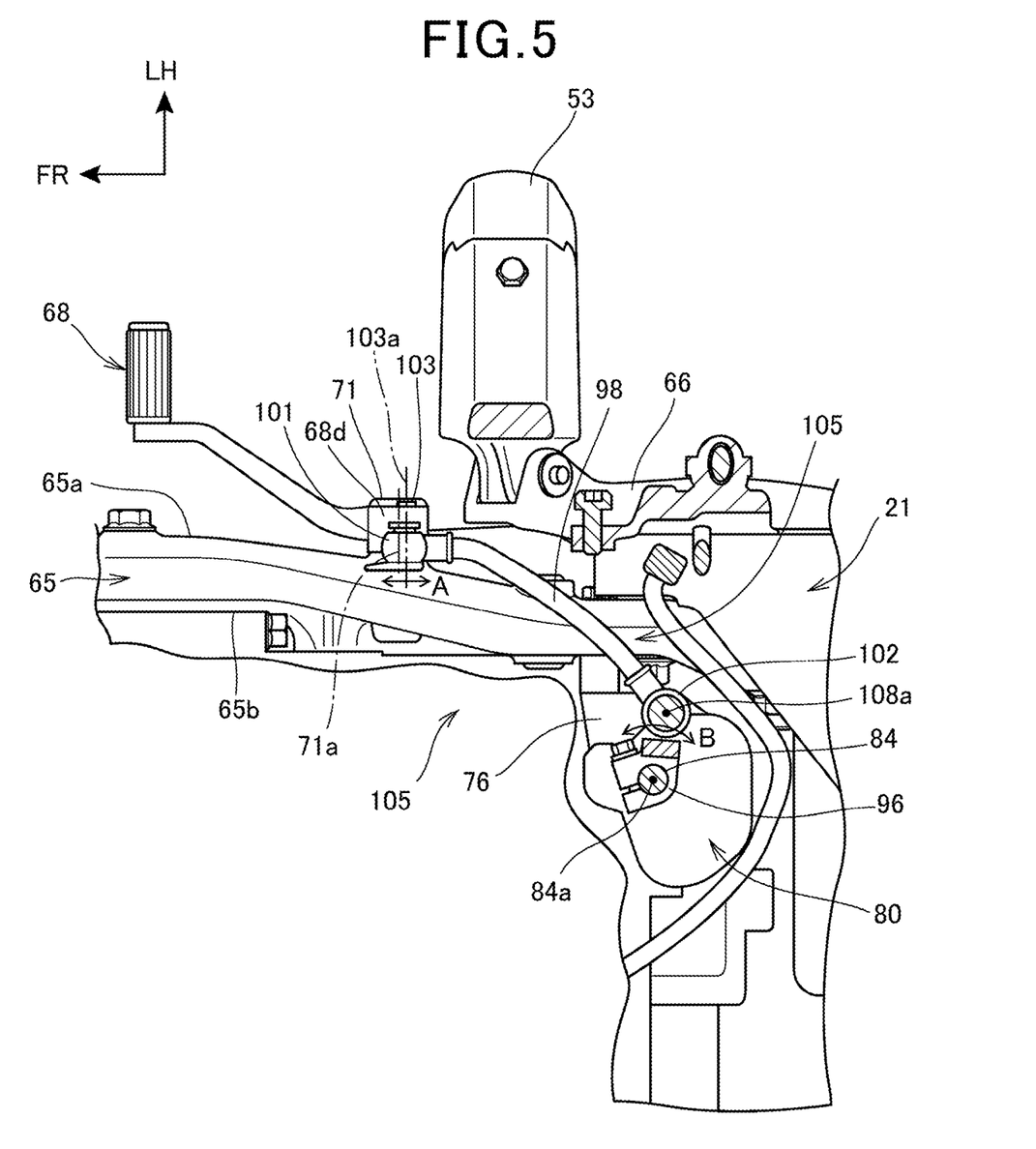
FIG. 5 is a cross-sectional view along a V-V line in FIG. 2.

FIG. 5 is a cross-sectional view along a V-V line in FIG. 2.

The gear change pedal 68 is attached to an outer side surface 65*a* of the lower frame 65, and the speed change detection device 80 is attached to an inner side surface 65*b* of the lower frame 65 via the stay 76.

The link for detection 98 is formed in a curved shape on a bottom view, and ball joints 101, 102 are attached to both end parts. Though the ball joints 101, 102 are in the same structure, reference numerals are different for identification of explanation here.

One ball joint 101 is provided with a support shaft 103 extending in the vehicle width direction, and the support shaft 103 is attached to the second arm portion 68*d* of the gear change pedal 68. An axis 103*a* passing through a center of a cross section of the support shaft 103 extends in the vehicle width direction.

Further, the other ball joint 102 is coupled with the tip part of the arm for detection 96 attached to the lower end part of the turning shaft 84 of the speed change detection device 80. The arm for detection 96 constitutes a part of the speed change detection device 80.

At an initial position (a position when the gear change pedal 68 is not operated) of the arm for detection 96, the arm for detection 96 extends outward in the vehicle width direction from the turning shaft 84.

The link for detection 98 is arranged below the lower frame 65 in such a manner of being across the inner side of the lower frame 65 in the vehicle width direction and the outer side in the vehicle width direction.

The support bolt 71 rockably supporting the gear change pedal 68 is attached to the lower frame 65 in such a manner of extending in the vehicle width direction. That is, an axis 71*a* passing through a center of a cross section of the support bolt 71 extends in the vehicle width direction.

Further, the turning shaft 84 of the speed change detection device 80 extends in the up-down direction, and an axis 84*a* passing through a center of a cross section of the turning shaft 84 extends in the up-down direction.

That is, an angle formed by the axis 71*a* of the support bolt 71 and the axis 84*a* of the turning shaft 84 is 90°, and the axis 71*a* of the support bolt 71 and the axis 84*a* of the turning shaft 84 point in different directions. Note that the angle formed by the axis 71*a* of the support bolt 71 and the axis 84*a* of the turning shaft 84 may be an angle other than 90°.

When the second arm portion 68*d* of the gear change pedal 68 rocks in the front-back direction as shown by an arrow A, accompanying a speed change operation of the gear change pedal 68, this rocking is transmitted to the arm for detection 96 of the speed change detection device 80 by the link for detection 98, and the arm for detection 96 rocks in the front-back direction with the turning shaft 84 as a center as shown by an arrow B. At this time, the rocking of the second arm portion 68*d* around the support bolt 71 extending in the vehicle width direction is changed to the rocking of the arm for detection 96 around the turning shaft 84 extending in the up-down direction. Thus, by using the link for detection 98 and the ball joints 101, 102, it becomes possible to change the angle formed by the two axes to 90° or an angle other than 90°. Further, since the link for detection 98 is curved, a degree of arrangement flexibility of the speed change detection device 80 relative to the gear change pedal 68 can be increased.

The gear change pedal 68, the link for detection 98 and the speed change detection device 80 described above constitute the transmission 105.

As shown in FIGS. 1, 2 and 5 above, the motorcycle 10 as a saddled vehicle is provided with the vehicle body frame 11, the step for driver 53 as a main step, the gear change pedal 68 as an operation pedal, the link for detection 98 as a link member and the speed change detection device 80.

The step for driver 53 extends outward in the vehicle width direction from the vehicle body frame 11 so that the rider's foot is put thereon. The gear change pedal 68 is turn-operated by the rider's foot for speed change, and the link for detection 98 is coupled with the gear change pedal 68. The speed change detection device 80 is coupled with a tip of the link for detection 98 and detects a speed change operation by the gear change pedal 68.

The gear change pedal 68 is arranged on the outer side of the vehicle body frame 11 (specifically, the lower frame 65) in the vehicle width direction, and the speed change detection device 80 is arranged on the inner side of the vehicle body frame 11 (specifically, the pivot frame 21 and the lower frame 65) in the vehicle width direction.

According to this configuration, the vehicle body frame 11 is provided between the gear change pedal 68 and the speed change detection device 80, the vehicle body frame 11 can be arranged close to a center in the vehicle width direction, and a structure can be such that is easy to knee-grip. Thereby, it becomes easy to hold a posture of the rider. Further, it is possible to arrange the speed change detection device 80 on the inner side of the vehicle body frame 11 in the vehicle width direction, and it is possible to protect the speed change detection device 80 by the vehicle body frame 11.

Further, as shown in FIG. 5, the speed change detection device 80 is arranged above the exhaust pipe 35 (specifically, the aggregation portion 35A) to discharge exhaust gas of the vehicle.

According to this configuration, it is possible to protect the speed change detection device 80 from dust, muddy water, kicked-up pebbles and the like by the exhaust pipe 35.

Figure 6:
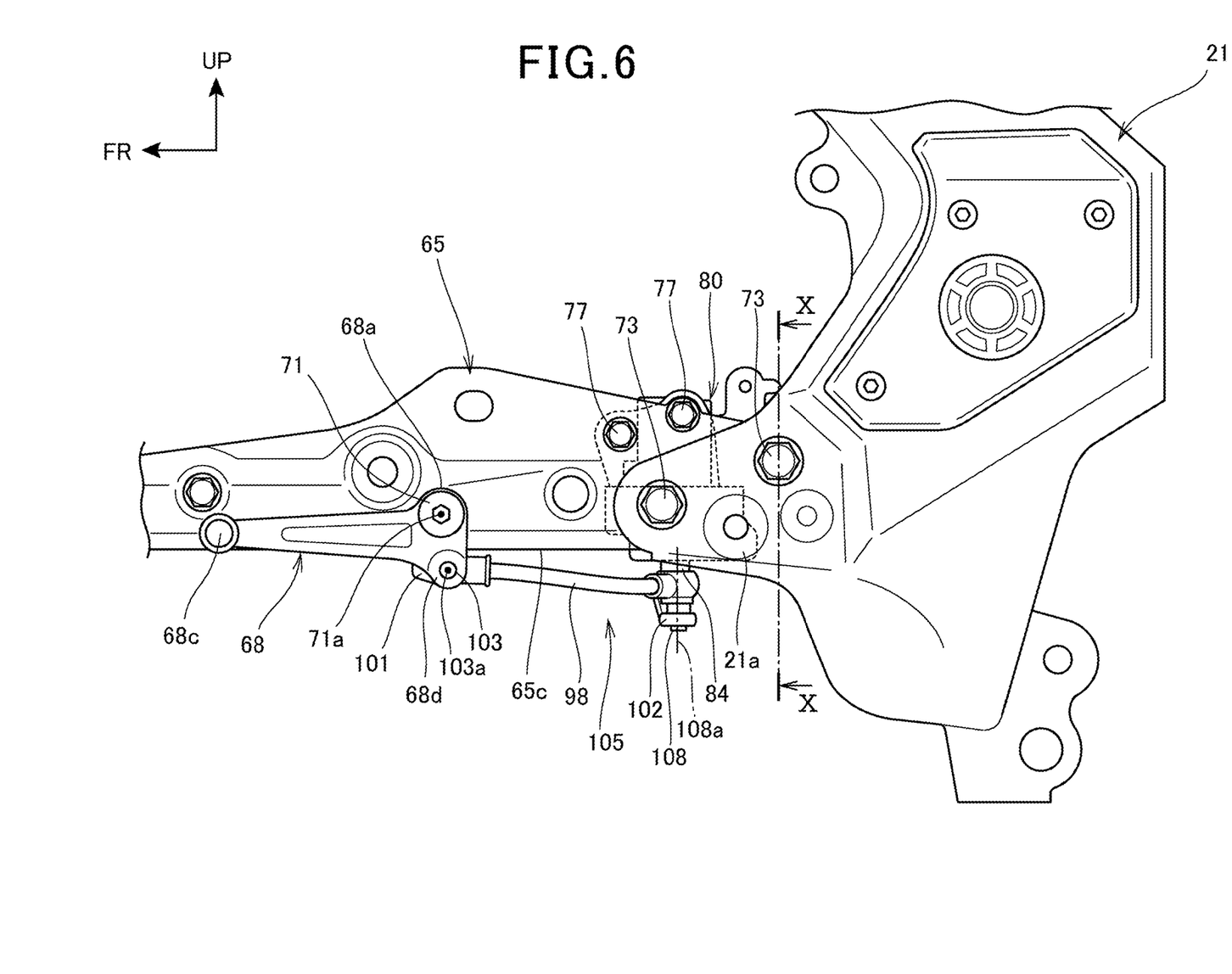
FIG. 6 is a left side view showing arrangement of the transmission.
Figure 7:
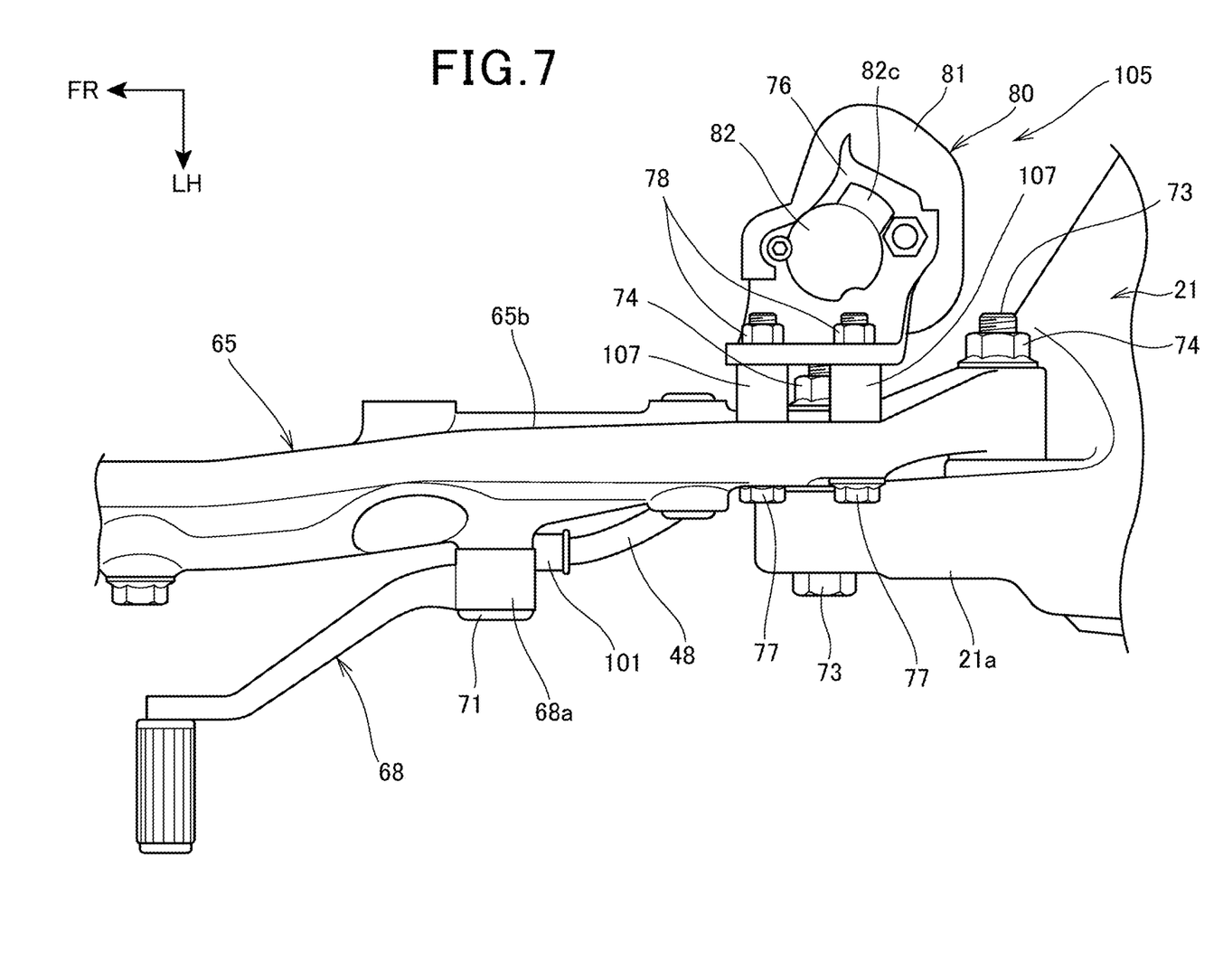
FIG. 7 is a plan view showing the arrangement of the transmission.

FIG. 6 is a left side view showing arrangement of the transmission 105; and FIG. 7 is a plan view showing the arrangement of the transmission 105. Note that the step bracket 66 (see FIG. 2) and the stand bracket 67 (see FIG. 2) attached to the pivot frame 21 are omitted.

As shown in FIGS. 6 and 7, the link for detection 98 extends in the front-back direction along a lower surface 65*c* of the lower frame 65 on a side view. Further, the link for detection 98 intersects with the lower frame 65 on a plan view.

The stay 76 supporting the speed change detection device 80 is fixed to the lower frame 65 with a plurality of bolts 77 and nuts 78. Between the inner side surface 65*b* of the lower frame 65 and the stay 76, cylindrical collars 107 playing a role of spacers are arranged in a state of being fitted on the bolts 77.

The lower frame 65 is gradually located on a more inner side in the vehicle width direction as being near to a rear end of the vehicle, and a rear end part of the lower frame 65 is fastened to an inner side surface of a lower part protruding portion 21*a* of the pivot frame 21. Therefore, a space between the rear end part of the lower frame 65 to which the speed change detection device 80 is attached and the lower part protruding portion 21*a* of the pivot frame 21 in the vehicle width direction is narrow. Similarly, above the rear end part of the lower frame 65 and the lower part protruding portion 21*a* of the pivot frame 21, a width of the vehicle body frame 11 (see FIG. 1) in the vehicle width direction is narrow, and, therefore, knee-grip is easy to perform.

The one ball joint 101 coupled with the gear change pedal 68 is arranged on an inner side of the second arm portion 68*d* of the gear change pedal 68 in the vehicle width direction and arranged below the supported portion 68*a* of the gear change pedal 68.

Further, the other ball joint 102 coupled with the speed change detection device 80 is arranged protruding below the lower part protruding portion 21*a* formed on a lower part of the pivot frame 21 in such a manner of protruding forward and the lower frame 65.

The link for detection 98 is formed in a shape curved upward and downward on a side view and couples the ball joint 101 and the ball joint 102 with a height different from a height of the ball joint 101 (with a lower height). Thus, by using the ball joints 101, 102, the link for detection 98 can be curved, and coupling between the second arm portion 68*d* of the gear change pedal 68 and the turning shaft 84 of the speed change detection device 80 with different heights can be easily performed.

In a vehicle for which mounting of the speed change detection device 80 is not set, it is possible to utilize the gear change pedal 68. That is, one end of a link member is coupled with the second arm portion 68*d* of the gear change pedal 68, and the other end of the link member is coupled with a shift shaft protruding from a side surface of the transmission 28 (see FIG. 1) via an arm. Thereby, it becomes possible to mechanically perform a speed change operation. Therefore, versatility of the gear change pedal 68 is improved, and cost can be suppressed.

As shown in FIGS. 5 and 6 above, the speed change detection device 80 is supported by the stay 76 fixed to the vehicle body frame 11 (specifically, the lower frame 65), and the link for detection 98 couples the gear change pedal 68 and the speed change detection device 80 in such a manner that the axis 71*a* of the support bolt 71 as a rocking shaft of the gear change pedal 68 and the axis 84*a* of the turning shaft 84 provided for the speed change detection device 80 point in different directions.

According to this configuration, it becomes possible to cause a longitudinal direction of the speed change detection device 80 to point in the up-down direction, and the whole speed change detection device 80 can be arranged close to the vehicle body frame 11. Therefore, the stay 76 can be downsized. Thereby, the vehicle body frame 11 can be arranged closer to the center in the vehicle width direction, and, even if the speed change detection device 80 is provided, a structure is such that is easy to knee-grip. Therefore, it is possible to make it easy to hold a posture.

Further, the link for detection 98 is curved and coupled with the gear change pedal 68 and the speed change detection device 80 via the ball joints 101, 102.

According to this configuration, it is possible to, even if shaft directions of the support bolt 71 as a turning shaft of the gear change pedal 68 and the turning shaft 84 of the speed change detection device 80 are different, transmit a speed change operation of the gear change pedal 68 to the speed change detection device 80 without a trouble.

Figure 8:
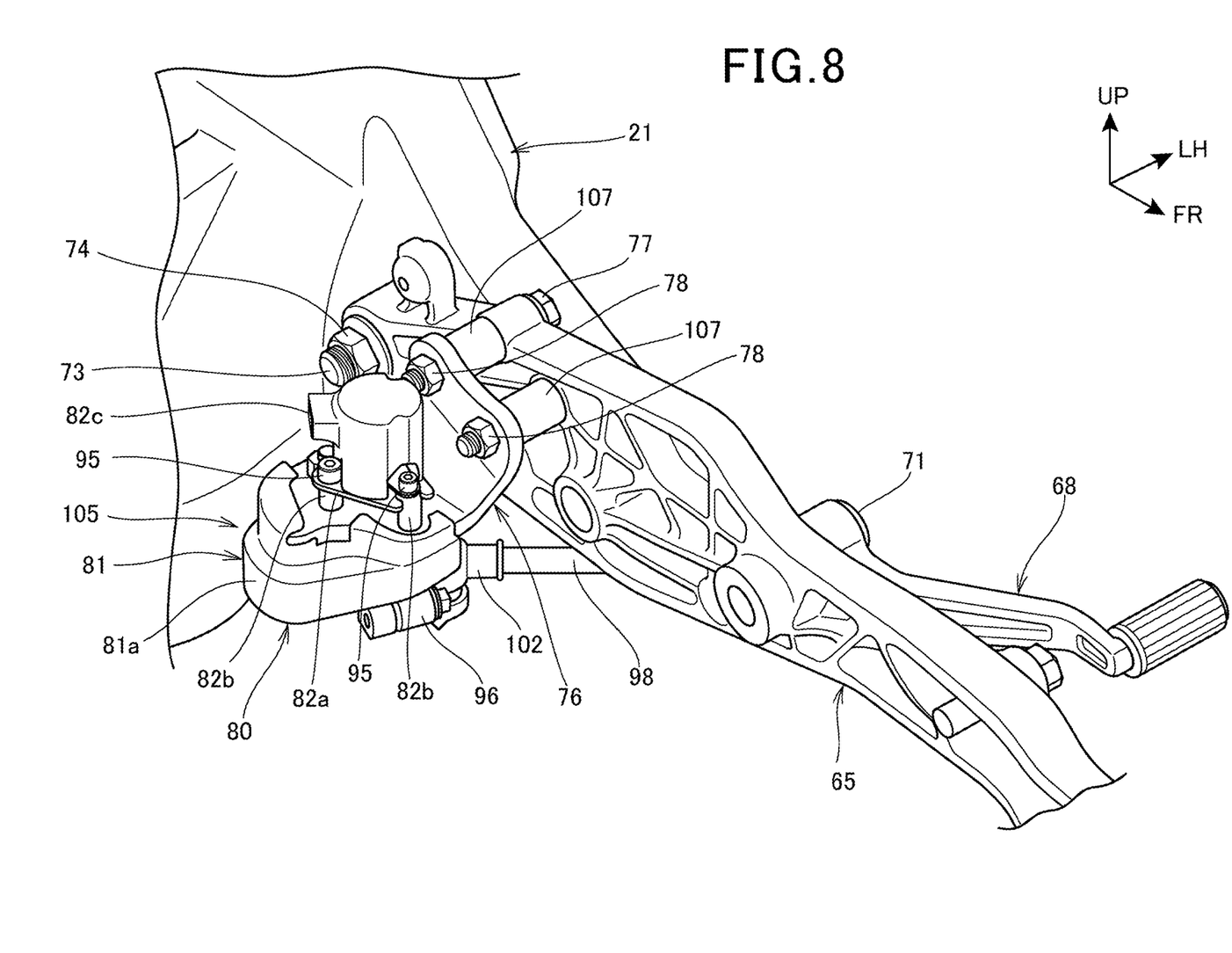
FIG. 8 is a perspective view showing the arrangement of the transmission.
Figure 9:
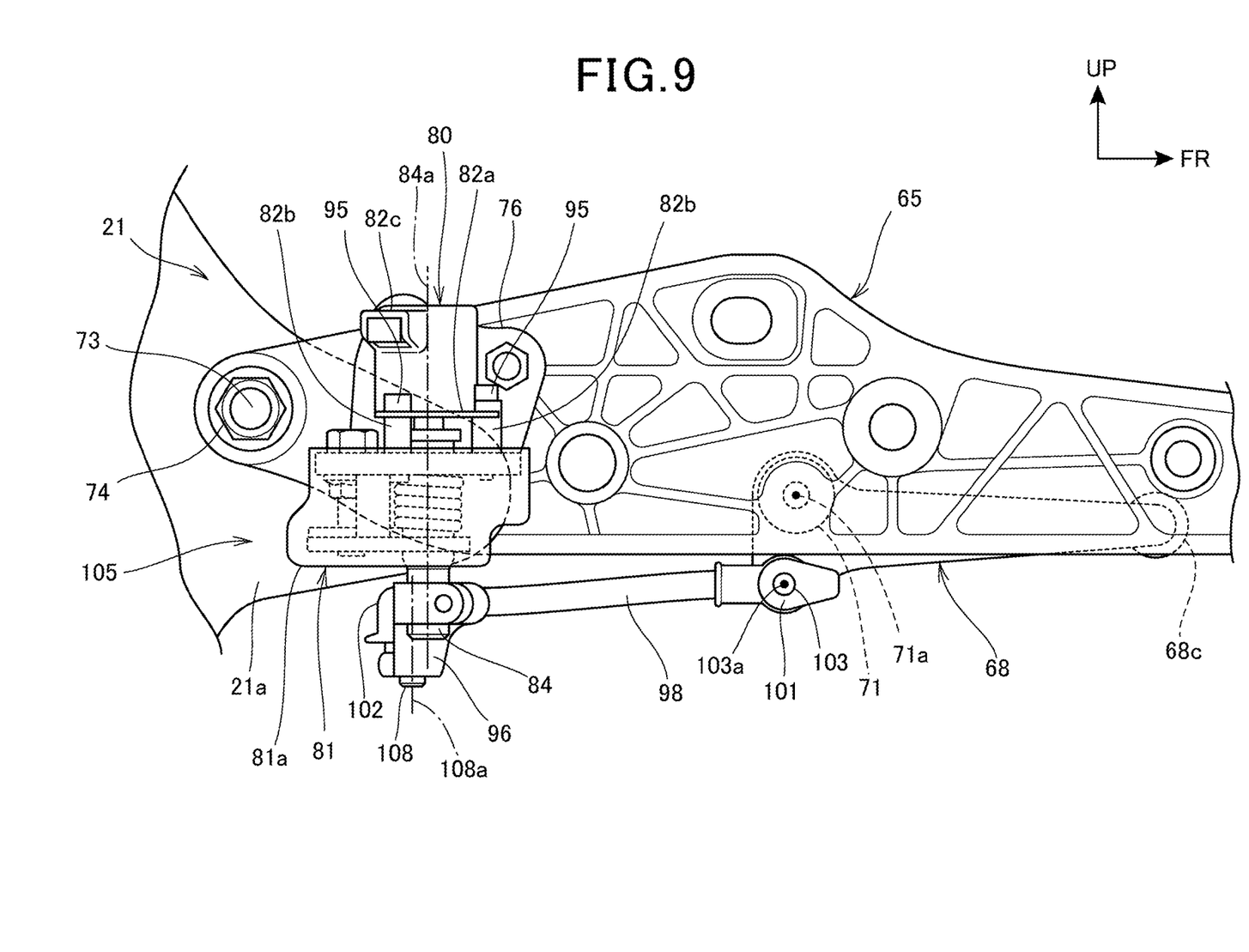
FIG. 9 is a right side view showing the arrangement of the transmission.

FIG. 8 is a perspective view showing the arrangement of the transmission 105, and FIG. 9 is a right side view showing the arrangement of the transmission 105.

As shown in FIGS. 8 and 9, the stay 76 and the speed change detection device 80 are covered with the pivot frame 21 and the lower frame 65 from the outer side in the vehicle width direction. Thereby, appearance of the motorcycle 10 (see FIG. 1) can be improved, and the speed change detection device 80 can be protected from kicked-up pebbles and a collision object from a lateral direction.

Further, since the pivot frame 21 and the lower frame 65 located in an outer side direction of the speed change detection device 80 are combined overlapping with each other in the vehicle width direction, rigidity of this part is increased, vibration is suppressed, and the vibration transmitted to the speed change detection device 80 can be suppressed.

The speed change input portion 81 is provided with a cover member 81*a*, and an inside of the speed change input portion 81 is externally covered with the stay 76 and the cover member 81*a*.

The flange 82*a* of the sensor for speed change detection 82 is provided with a plurality of tube portions 82*b* on its peripheral part, and the bolts 95 are screwedly combined with the stay 76 in a state in which the bolts 95 are inserted in the tube portions 82*b*, respectively.

On a side surface of an upper part of the sensor for speed change detection 82, a connector connecting portion 82*c* is provided. To the connector connecting portion 82*c*, a connector for harness to send a detection signal of a speed change operation by the sensor for speed change detection 82 to an ECU (Electronic Control Unit) is connected.

In the present embodiment, as shown in FIG. 2 and FIGS. 6 to 9, only the gear change pedal 68 constituting the transmission 105 is arranged on the outer side of the pivot frame 21 and the lower frame 65 in the vehicle width direction, and the speed change detection device 80 constituting the transmission 105 is arranged on the inner side of the pivot frame 21 and the lower frame 65 in the vehicle width direction. Thereby, the speed change detection device 80 is covered from a lateral direction, and, furthermore, the link for detection 98 is also covered with the step for driver 53 and the step bracket 66 from a lateral direction. Thus, parts arrangement on the side surface of the vehicle is simplified, and it is possible to give a clean impression and improve the appearance. Further, the speed change detection device 80 can be protected from the lateral direction. Further, since the link for detection 98 is arranged below the lower frame 65, space can be effectively utilized.

Further, in the present embodiment, since a base plate provided separately from a frame in order to support such a sensor for speed change operation detection, as conventionally provided is not required, and a rocking shaft of a gear change pedal does not protrude to the inner side in the vehicle width direction, it is possible to arrange the transmission 105 compactly in the vehicle width direction. Further, since the turning shaft 84 of the speed change detection device 80 is arranged in such a manner of extending in the up-down direction, it is possible to suppress an amount of protrusion of the transmission 105 to the inner side in the vehicle width direction and seek further compactness.

As shown in FIGS. 3 and 9 above, since the longitudinal direction of the speed change detection device 80 is the up-down direction, and the sensor for speed change detection 82 as a sensor body provided on the speed change detection device 80 is provided on an upper end of the speed change detection device 80, it is possible arrange the sensor for speed change detection 82 away from the ground. Therefore, the sensor for speed change detection 82 can be protected from dust, muddy water, pebbles and the like kicked up by the vehicle.

Figure 10:
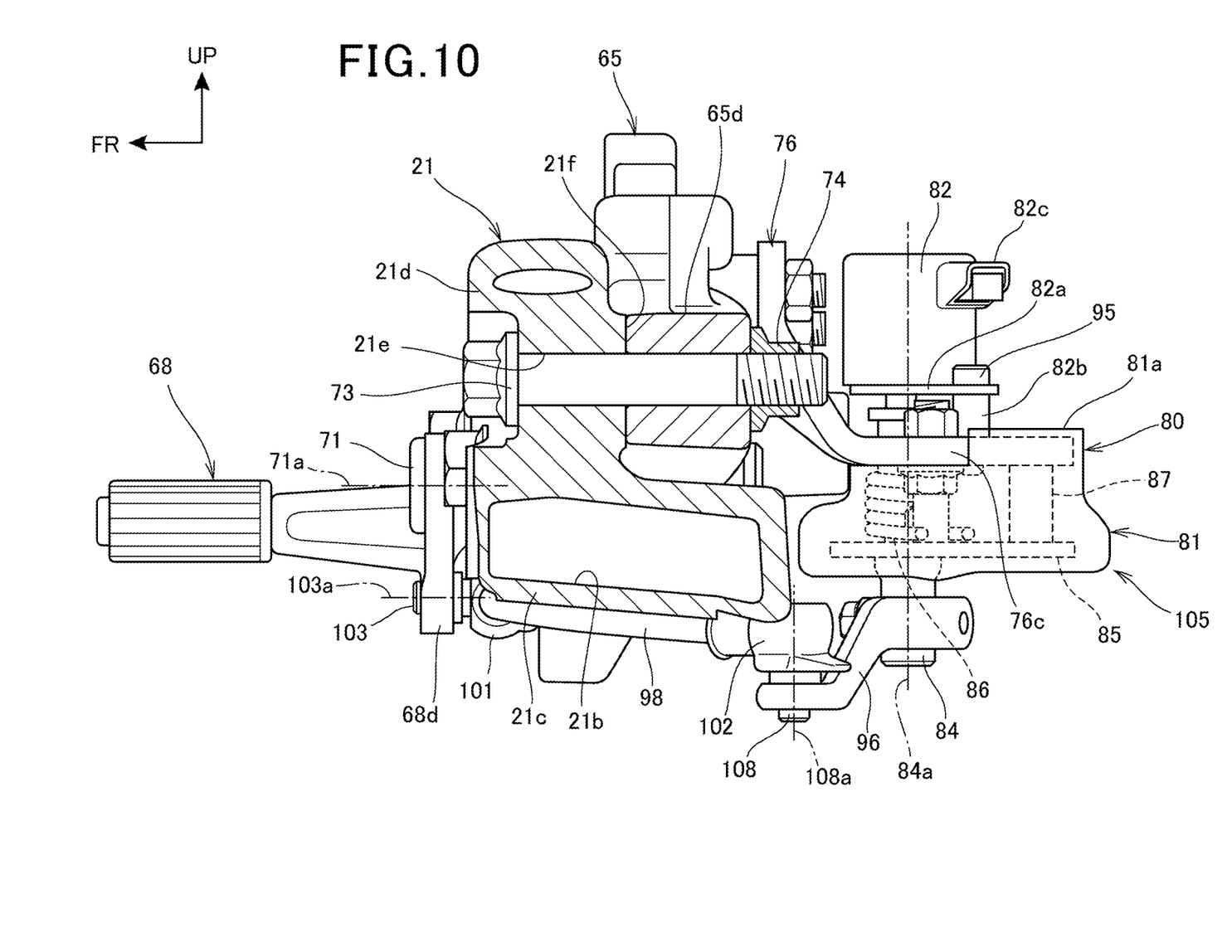
FIG. 10 is a cross-sectional view along an X-X line in FIG. 6.

FIG. 10 is a cross-sectional view along an X-X line in FIG. 6.

The lower part of the pivot frame 21 is configured with a frame lower portion 21*c* in which a hollow portion 21*b* is formed and a frame upper portion 21*d* protruding upward from a part on an outer side of the frame lower portion 21*c* in the vehicle width direction being integrally formed with an L-shaped cross section.

In the frame upper portion 21*d*, a through hole 21*e* extending in the vehicle width direction is made.

A rear end part 65*d* of the lower frame 65 is applied to an inner side surface 21*f* of the frame upper portion 21*d* of the pivot frame 21 and fastened to the frame upper portion 21*d* with a bolt 73 inserted in the through hole 21*e* of the frame upper portion 21*d* and a nut 74 screwed in tip part of the bolt 73.

As described above, by causing the lower part of the pivot frame 21 to have an L-shaped cross section, it is possible to prevent the lower frame 65 from projecting in the vehicle width direction and increase rigidity of the pivot frame 21.

The ball joint 102 is provided with a support shaft 108 extending in the up-down direction, and the support shaft 108 is attached to the arm for detection 96 of the speed change detection device 80. An axis 108*a* passing through a center of a cross section of the support shaft 108 extends in the up-down direction.

As shown in FIGS. 5 and 10 above, the link for detection 98 is arranged below the vehicle body frame 11 (specifically, the lower frame 65) in such a manner of being across the vehicle body frame 11 (the lower frame 65) in the vehicle width direction.

According to this configuration, it is not necessary to provide a hole for causing the link for detection 98 to pass through, in the vehicle body frame 11. Therefore, it is possible to make rigidity of the vehicle body frame 11 appropriate, and it is possible to improve running performance of the vehicle.

Further, as shown in FIGS. 3 and 10, the sensor for speed change detection 82 is arranged on an upper end part side of the turning shaft 84, and the link for detection 98 is coupled with a lower end part side of the turning shaft 84.

According to this configuration, it becomes possible to cause the turning shaft 84 to point in the up-down direction, and the whole speed change detection device 80 can be arranged close to the vehicle body frame 11. Therefore, the stay 76 can be downsized.

Thereby, the vehicle body frame 11 can be arranged closer to the center in the vehicle width direction, and, even if the speed change detection device 80 is provided, a structure is such that is easy to knee-grip. Therefore, it is possible to make it easy to hold a posture.

Further, as shown in FIGS. 1, 9 and 10, the vehicle body frame 11 is provided with the pair of left and right pivot frames 21 provided on a lower part in the front-back direction of the vehicle, and each of the pivot frames 21 is provided with the pivot shaft 22 rockably supporting the swing arm 14 to which the rear wheel 16 is attached. To the lower end part of the pivot frame 21, the lower frame 65 is connected in such a manner of overlapping in the vehicle width direction, and the speed change detection device 80 is arranged on an inner side of a connection part of the pivot frame 21 and the lower frame 65 in the vehicle width direction.

According to this configuration, it becomes possible to attach the speed change detection device 80 on or near the connection part of the pivot frame 21 and the lower frame 65 the rigidity of which has been increased by the connection, and it is possible to suppress vibration transmitted to the speed change detection device 80.

The embodiment stated above merely shows one aspect of the present invention, and modifications and applications are arbitrarily possible within a range not departing from the spirit of the present invention.

For example, though, in the present embodiment, the lower frame 65 is fastened to the lower part of the pivot frame 21 with the bolt 73 and the nut 74 as shown in FIG. 10, connection is not limited thereto, but the rear end part of the lower frame 65 may be connected to the lower part of the pivot frame 21 by welding.

REFERENCE SIGNS LIST

10 motorcycle (saddled vehicle)
11 vehicle body frame
35 exhaust pipe
53 step for driver (main step)
68 gear change pedal (operation pedal)
71 support bolt (rocking shaft)
71a axis (axis of rocking shaft)
76 stay
80 speed change detection device
82 sensor for speed change detection (sensor body)
84 turning shaft
84a axis
98 link for detection (link member)
101, 102 ball joint
105 transmission

The invention claimed is:

1. A transmission for a saddled vehicle comprising: a vehicle body frame, a main step which extends outward in a vehicle width direction from the vehicle body frame and on which a rider's foot may be placed, an operation pedal to be turn-operated by the rider's foot for speed change, a link member coupled with the operation pedal, and a speed change detection device coupled with a tip of the link member and detecting a speed change operation by the operation pedal, wherein the operation pedal is arranged on an outer side of the vehicle body frame in the vehicle width direction, and the speed change detection device is arranged on an inner side of the vehicle body frame in the vehicle width direction; and the link member crosses, below the vehicle body frame and in the vehicle width direction, and wherein the vehicle body frame is between the operation pedal and the speed change detection device.

2. The transmission for the saddled vehicle according to claim 1, wherein a longitudinal direction of the speed change detection device is an up-down direction, and a sensor body provided on the speed change detection device is provided on an upper end of the speed change detection device.

3. The transmission for the saddled vehicle according to claim 2, wherein the speed change detection device is supported by a stay fixed to the vehicle body frame, and the link member couples the operation pedal and the speed change detection device in such a manner that an axis of a rocking shaft of the operation pedal and an axis of a turning shaft provided for the speed change detection device point in different directions.

4. The transmission for the saddled vehicle according to claim 3, wherein the speed change detection device is arranged above an exhaust pipe discharging exhaust gas of the vehicle.

5. The transmission for the saddled vehicle according to claim 4, wherein the link member is curved and coupled with the operation pedal and the speed change detection device via ball joints.

6. The transmission for the saddled vehicle according to claim 5, wherein a sensor body of the speed changing detection device is arranged on an upper end part side of the turning shaft, and the link member is coupled with a lower end part side of the turning shaft.

7. The transmission for the saddled vehicle according to claim 3, wherein the link member is curved and coupled with the operation pedal and the speed change detection device via ball joints.

8. The transmission for the saddled vehicle according to claim 7, wherein a sensor body of the speed changing detection device is arranged on an upper end part side of the turning shaft, and the link member is coupled with a lower end part side of the turning shaft.

9. The transmission for the saddled vehicle according to claim 2, wherein the speed change detection device is arranged above an exhaust pipe discharging exhaust gas of the vehicle.

10. The transmission for the saddled vehicle according to claim 9, wherein the link member is curved and coupled with the operation pedal and the speed change detection device via ball joints.

11. The transmission for the saddled vehicle according to claim 1, wherein the speed change detection device is supported by a stay fixed to the vehicle body frame, and the link member couples the operation pedal and the speed change detection device in such a manner that an axis of a rocking shaft of the operation pedal and an axis of a turning shaft provided for the speed change detection device point in different directions.

12. The transmission for the saddled vehicle according to claim 11, wherein the link member is curved and coupled with the operation pedal and the speed change detection device via ball joints.

13. The transmission for the saddled vehicle according to claim 12, wherein a sensor body of the speed change detection device is arranged on an upper end part side of the turning shaft, and the link member is coupled with a lower end part side of the turning shaft.

14. The transmission for the saddled vehicle according to claim 11, wherein the speed change detection device is arranged above an exhaust pipe discharging exhaust gas of the vehicle.

15. The transmission for the saddled vehicle according to claim 14, wherein the link member is curved and coupled with the operation pedal and the speed change detection device via ball joints.

16. The transmission for the saddled vehicle according to claim 1, wherein the speed change detection device is arranged above an exhaust pipe discharging exhaust gas of the vehicle.

17. The transmission for the saddled vehicle according to claim 16, wherein the link member is curved and coupled with the operation pedal and the speed change detection device via ball joints.

18. The transmission for the saddled vehicle according to claim 17, wherein a sensor body of the speed change detection device is arranged on an upper end part side of a turning shaft provided to the speed changing detection device, and the link member is coupled with a lower end part side of the turning shaft.

19. A transmission for a saddled vehicle comprising:
a vehicle body frame, a main step which extends outward in a vehicle width direction from the vehicle body frame and on which a rider's foot may be placed, an operation pedal to be turn-operated by the rider's foot for speed change, a link member coupled with the operation pedal, and a speed change detection device coupled with a tip of the link member and detecting a speed change operation by the operation pedal, wherein
the operation pedal is arranged on an outer side of the vehicle body frame in the vehicle width direction, and the speed change detection device is arranged on an inner side of the vehicle body frame in the vehicle width direction; and
the link member is located below the vehicle body frame and crosses the vehicle body frame in the vehicle width direction,
the speed change detection device is supported by a stay fixed to the vehicle body frame, and the link member couples the operation pedal and the speed change detection device in such a manner that an axis of a rocking shaft of the operation pedal and an axis of a turning shaft provided for the speed change detection device point in different directions.

20. A transmission for a saddled vehicle comprising:
a vehicle body frame, a main step which extends outward in a vehicle width direction from the vehicle body frame and on which a rider's foot may be placed, an operation pedal to be turn-operated by the rider's foot for speed change, a link member coupled with the operation pedal, and a speed change detection device coupled with a tip of the link member and detecting a speed change operation by the operation pedal, wherein
the operation pedal is arranged on an outer side of the vehicle body frame in the vehicle width direction, and the speed change detection device is arranged on an inner side of the vehicle body frame in the vehicle width direction; and
the link member is located below the vehicle body frame and crosses the vehicle body frame in the vehicle width direction,
the link member is curved and coupled with the operation pedal and the speed change detection device via ball joints.

* * * * *